United States Patent
Adapathya et al.

(10) Patent No.: US 6,724,970 B2
(45) Date of Patent: Apr. 20, 2004

(54) CABLE MANAGEMENT DEVICE FOR MIXED MEDIA

(75) Inventors: Ravi Shankarnarayan Adapathya, Durham, NC (US); William Laird Dungan, Cary, NC (US); Pat Gallarelli, Chapel Hill, NC (US); Todd William Justus, Raleigh, NC (US); Mark John Lawrence, Cary, NC (US); Timothy Andreas Meserth, Durham, NC (US); Lisa Michele Vizer, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/364,074

(22) Filed: Feb. 11, 2003

(65) Prior Publication Data

US 2003/0123832 A1 Jul. 3, 2003

Related U.S. Application Data

(62) Division of application No. 09/723,652, filed on Nov. 28, 2000, now Pat. No. 6,546,181.

(51) Int. Cl.$^7$ ................................ G02B 6/00; F16L 3/22
(52) U.S. Cl. ........................ 385/135; 248/65; 248/68.1
(58) Field of Search ................................ 385/134–135; 248/65–74.5

(56) References Cited

U.S. PATENT DOCUMENTS

| | | | |
|---|---|---|---|
| 4,679,123 A | 7/1987 | Young | 361/428 |
| 5,135,187 A | 8/1992 | Joas et al. | 248/49 |
| 5,204,929 A | 4/1993 | Machall et al. | 385/135 |
| 5,530,787 A | * 6/1996 | Arnett | 385/137 |
| 5,640,482 A | 6/1997 | Barry et al. | 385/135 |
| 5,647,045 A | * 7/1997 | Robinson et al. | 385/135 |
| 5,715,348 A | * 2/1998 | Falkenberg et al. | 385/135 |
| 5,839,702 A | 11/1998 | Jette | 248/49 |
| 5,911,027 A | 6/1999 | Macken et al. | 385/135 |
| 6,438,311 B1 | * 8/2002 | Zarnowitz | 385/135 |

* cited by examiner

Primary Examiner—Akm Enayet Ullah
Assistant Examiner—Jerry T Rahll
(74) Attorney, Agent, or Firm—Joscelyn G. Cockburn

(57) ABSTRACT

A method and structure for managing computer hardware cable media is provided, featuring a support having a frontal face, at least one flange, and at least one curved surface projecting from the support frontal face for receiving and guiding cable media. The curved surface has a radius sufficiently large enough to receive and redirect cable media by bending the cable media without cracking or causing other damage to the cable media. The flange is connected to a computer rack system rail so that support is overlapping at least one hardware component connected to the computer rack system, thereby allowing a portion of the rack space occupied by the flange and the support to be utilized by other hardware components, increasing the effective usable space of the rack system. Cable media are received onto the curved surface, redirected by bending along the curved surface, and ultimately distributed in discrete bundles of cable media to hardware devices. The discrete bundles of cable media are spaced from any other cable media, so that the bundle of cable media may be disconnected from its associated hardware device or otherwise manipulated by hand without disturbing any other cable media.

9 Claims, 4 Drawing Sheets

CABLE MANAGEMENT DEVICE FOR MIXED MEDIA

This divisional application claims priority of application Ser. No. 09/723,652, filed Nov. 28, 2000, now U.S. Pat. No. 6,546,181.

FIELD OF THE INVENTION

This invention relates generally to a method and structure for managing cable media in computer rack system hardware installations.

BACKGROUND ART

While the invention is not so limited, it is especially useful in network computer equipment applications where large numbers of mixed cable media must be connected to network equipment. Network equipment components are typically mounted in open racks or closed cabinets. The various components are interconnected to each other electronically to thereby form a network computer system by "cable media." Exemplary cable media include copper wiring and fiber-optic cabling. A typical network hardware installation requires a large number of individual cables, and management of this cable media is required in order to ensure access to the individual network components. The more cables that must be moved to gain access to a component, the longer the time periods required to service or replace equipment. The large number and volume of unorganized cables in a typical prior art hardware installation physically interferes with access to the components. Moreover, in the process of moving cables aside to reach the adapters, one may also inadvertently cause difficult-to-isolate partial cable disconnects, further slowing maintenance and repair activities. Accordingly, the increased time requirements involved in servicing computer hardware utilizing no cable management or prior art cable management systems increases the downtime of the hardware itself when service is required, which is a significant problem since when a device supports mission-critical functions. What is needed is a cable media management structure and method that organizes cable media in a way that minimizes the numbers of cables that must be moved or otherwise manipulated in order to gain access to the network components.

Another problem in the use of cable management media is the space required for the installation of the media. The more rack or cabinet space required for the cable management system, the less space available for network components themselves. Similarly, there may not be sufficient space on a rack or in a cabinet to install all of the cable management components required for adequate cable management. Accordingly a space-efficient cable management system is also desired.

Lastly, an additional problem is managing cable media without damaging individual cables. This problem is of a particular concern in the handling of fiber-optic cabling, which has a high failure rate in network installation applications. The glass core of fiber-optic cables will crack and break if they are not kept from bending more than a specified bend radius—typically 1.5 inches.

Therefore, what is needed is a method and structure for a cable management solution that provides superior organization of cable media by organizing the cables so that a minimum number of cables must be moved or handled in order to service a component. The structure and method must take up a minimal amount of rack or cabinet real estate. And the management solution must protect the cable media from damage, in particular fiber-optic media. It is also preferred that the system organize the cables into discrete groupings readily identifiable and associated with each specific hardware component, thereby providing rapid identification of the associated cable media and speeding up the servicing time period.

SUMMARY OF THE INVENTION

A method and structure for managing computer hardware cable media is provided, featuring a support having a frontal face, at least one flange, and at least one curved surface projecting from the support frontal face for receiving and guiding cable media. The curved surface has a radius sufficiently large enough to receive and redirect cable media by bending the cable media without cracking or causing other damage to the cable media. The flange is connected to a computer rack system rail so that support is overlapping at least one hardware component connected to the computer rack system, thereby allowing a portion of the rack space occupied by the flange and the support to be utilized by other hardware components and increasing the effective usable space of the rack system. Cable media are received onto the curved surface, redirected by bending along the curved surface, and ultimately distributed in discrete bundles of cable media to hardware devices. The discrete bundles of cable media are spaced from any other cable media, so that the bundle of cable media may be disconnected from its associated hardware device or otherwise manipulated by hand without disturbing any other cable media.

DESCRIPTION OF THE PREFERRED EMBODIMENT(S)

Figure 1:
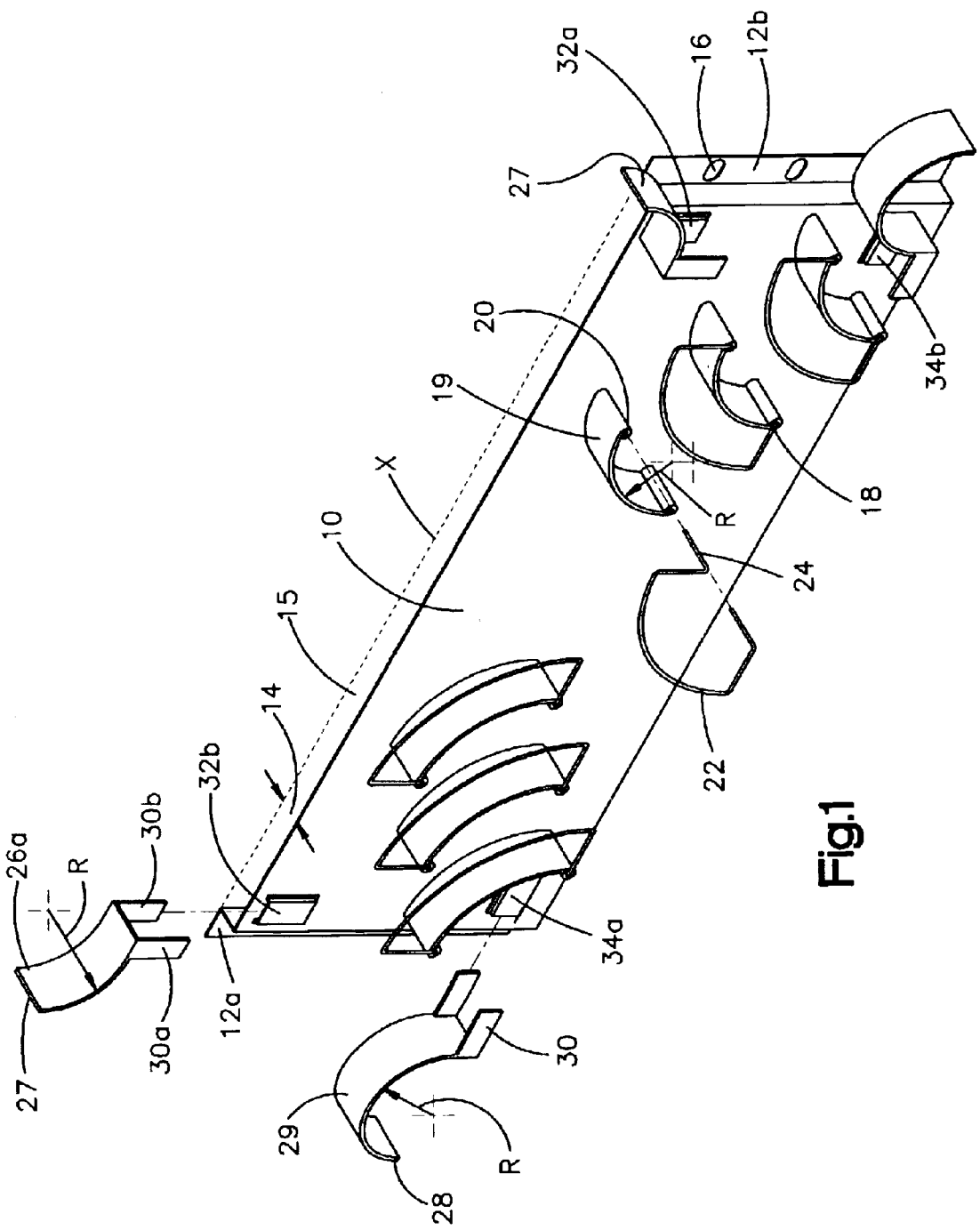
FIG. 1 is a frontal perspective view of a cable management device according to the present invention.

According to the present invention, a method and structure for managing cable media is provided. FIG. 1 illustrates one embodiment of the present invention. A rectangular planar sheet metal support 10 has first and second planar rack mounting flanges 12 at either end. Alternative embodiments of the support 10 and flanges 12 may be fabricated from other substantially rigid or resilient materials, such as die-cast metals or thermoplastic materials. The two flanges 12 lie in a common plane X, and this common plane X is parallel to and offset from the support 10 by an offset distance 14. The offset 14 enables the flanges 12 to be aligned with and attached to a rack rail (not shown), wherein the support 10 will be aligned not with the rack but with a desired point of reference offset by the offset distance 14 from the rack rail. An example of such an application is where an equipment rack (not shown) is offset from a surface "skin" of the rack enclosure (not shown), as is well known in the art. Furthermore, the area defined by the space between the common plane X and the support 10 is an offset area 15. By defining the offset distance 14 as a value equal to or greater than about 0.075 inches, the resultant offset area 15 is large enough to enable airflow behind the support 10 when the flanges 16 are attached to a computer rack. This is an important feature that will be discussed more thoroughly later in this specification.

The mechanical dimensions of the embodiment of the invention shown in FIG. 1 are designed to conform to the Electronics Industry Association® ("EIA") RS-310-D standard for computer hardware installation racks and panels. The total length of the support 10 and flanges 12 is nineteen inches, and the flanges 12 have bolt-holes 16 spaced in a RS-310-D "universal" bolt-hole pattern, enabling the embodiment of the invention of FIG. 1 for mounting onto a nineteen inch universal RS-310-D vertical rack. Alternative embodiments of the invention (not shown) may have "Y" pattern bolt-hole 16 spacing for attachment to nineteen inch Y-pattern RS-310-D vertical racks. Similarly, the overall length of the support 10 and flanges 12 may be about twenty-four inches, and the bolt-holes 16 patterned to attach to twenty-four inch universal or Y-pattern racks. It is also readily apparent that the invention may be adapted to horizontal rack installations (not shown). Therefore, it is important to note that the invention can be designed to conform to other standards and dimensions as well, as is apparent to one skilled in the art of computer hardware installations, and the invention described herein is not restricted to EIA RS-310-D equipment applications.

The support 10 has a plurality of curved cable guides 18 permanently affixed to and projecting from its surface for receiving and guiding cable media. Each guide 18 has a cable support surface 19 and a pair of pin receivers 20 at either end of the surface 19. The pin receivers 20 receive a removable cable retainer 22. The cable retainer 22 shown is formed from a metal rod, although any substantially rigid or resilient material may be used, such as a die-cast metal or a thermoplastic material. The cable retainer 22 may be removably attached to a cable guide 18 by inserting the pair of mounting pins 24 located at the ends of the cable retainer 22 into the pin receivers 20.

FIG. 1 also illustrates a removable sheet metal 90-degree rollout arm 26, and a removable sheet metal 180-degree rollout arm 28. As with the support 10 and guide 18, they may also be fabricated from any substantially rigid or resilient material, such as a die-cast metal or thermoplastic materials. The 90-degree rollout arm 26 has a supporting surface 27, and the 180-degree rollout arm 28 has a supporting surface 29. The 90-degree rollout arm 26 further has a pair of mounting tabs 30 at either end of the supporting surface 27, and the 180-degree rollout arm 28 similarly has a pair of mounting tabs 30 at either end of the supporting surface 29. As shown in FIG. 1, a 90 degree rollout arm 26 may be detachably attached to the support 10 by sliding one mounting tab 30 into an upper vertical tab slot 32. Similarly, a 180-degree rollout arm 28 is shown detachably attached to the support 10 by sliding one mounting tab 30 into a lower horizontal tab slot 34. The rollout arms 26 and 28 may be readily attached to or detached from the support 10 as needed. Moreover, the 90-degree rollout arm 26 and the 180-degree rollout arm 28 may be used interchangeably in any of the upper vertical slots 32 or lower horizontal slots 34. For example, the 90-degree rollout arm 26*a* may be attached to any of the four mounting slots 32 and 34. First, referring again to FIG. 1, tab 30*b* may be inserted into upper left vertical slot 32*b*. Secondly, the rollout arm 26*a* may be rotated horizontally by one hundred and eighty degrees from the position shown in FIG. 1 and tab 30*b* inserted into upper right vertical slot 32*a*. Thirdly, the rollout arm 26*a* may be rotated from the position shown in FIG. 1 vertically ninety degrees to the right and then horizontally by one hundred and eighty degrees, and tab 30*a* inserted into lower left horizontal slot 34*a*. And fourth and lastly, the rollout arm 26*a* may be rotated from the position shown in FIG. 1 vertically ninety degrees to the right and tab 30*b* inserted into lower right horizontal slot 34*b*. In a similar fashion the 180-degree rollout arm 28 may also be inserted into any of the four mounting slots 32 or 34.

Figure 2:
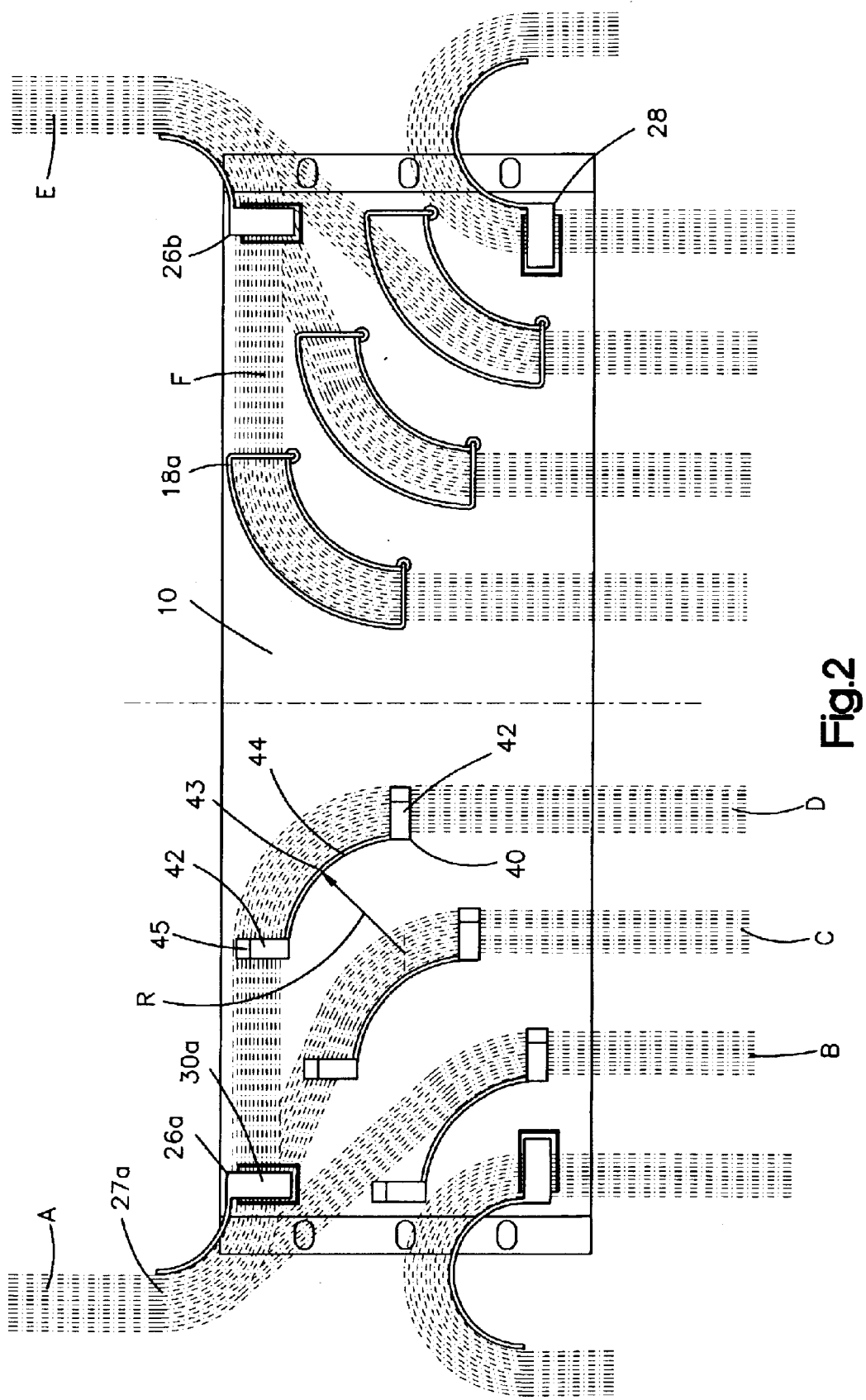
FIG. 2 is a front elevation view of another embodiment of the present invention, shown managing cable media.

FIG. 2 shows one embodiment of the invention implemented in the management of computer hardware cable media. In this embodiment three of the curved guides 18 and attached cable retainers 22 are shown holding discrete bundles of cable media C. Another embodiment of a cable guide according to the present invention, a sheet metal curved retaining cable guide 40, is also shown. As with the support 10 and guide 18, it may also be fabricated from any substantially rigid or resilient material, such as a die-cast metal or thermoplastic material. Each curved retaining cable guide 40 has two retaining arms 42, one at each end of a supporting surface 43, and the arms 42 are formed from and integral with the guide body 44, which is itself permanently affixed to the support 10. The arms 42 are normal to the supporting surface 43, and at the end of each arm 42 is an arm tip 45. The tips 45 help prevent cable media from being lifted up and off of the supporting surfaces 43 The tip 45 is formed by bending a portion of the end of the arm 42 toward the support 10, resulting in angle of deflection from the planar 42 of about thirty degrees. Although the embodiment of the invention illustrated has cable guides 18 and 40 permanently affixed to the support 10, it is important to note that alternative embodiments of the invention may entirely comprise removable guides (not shown), connected to the support 10 in a similar fashion as the rollout arms 26 and 28. FIG. 2 also shows a number of rollout arms 26 and 28 removably attached to the support 10.

Figure 3:
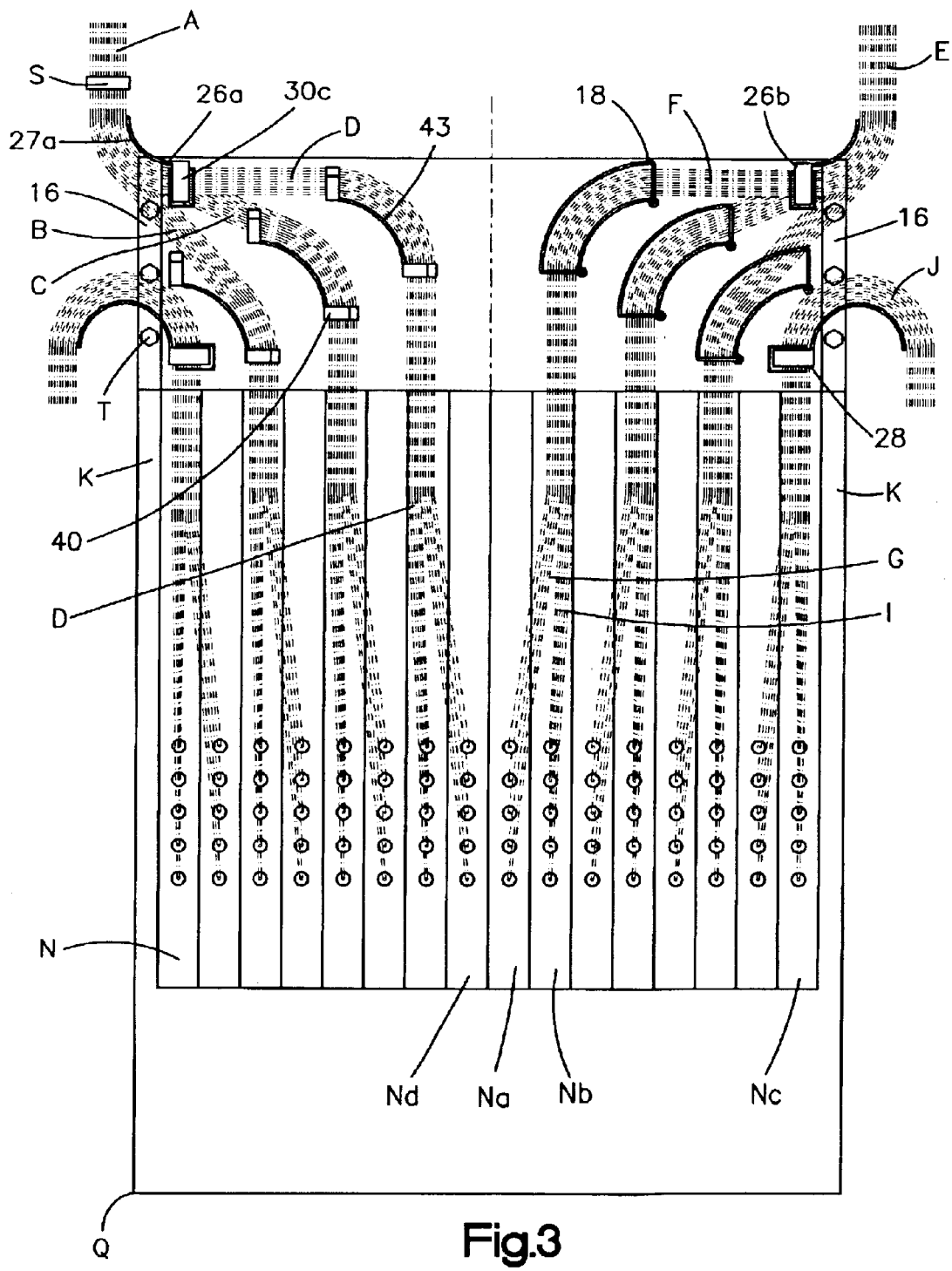
FIG. 3 is another front elevation view of the invention of FIG. 2, wherein the invention is shown attached to a computer rack system.

Referring now to FIG. 3, the invention of FIG. 2 is shown attached to a computer hardware rack system Q. The flanges 16 are bolted to two parallel EIA RS-310-D compliant vertical rack rails K by bolts T. A vertically-oriented cable media bundle A is received from a downward direction by the cable support surface 27*a* of a ninety-degree rollout arm 26*a* and redirected substantially horizontally by the surface 27*a*. The outer mounting tab 30*a* of the rollout arm 26*a* here serves as a cable retaining device, holding at least a portion of the bundle A onto the rollout arm surface 27*a*. As is apparent from the illustration, by banding the cables together in bundle A with a strap S, the strap S enables the tab 30*a* to retain the entire bundle A from movement outward and off of the rollout arm 26*a*, even though not all of the cables are directly in contact with the tab 30*a*. The Bundle A is then distributed as bundles B, C and D, wherein one bundle is handled by each of three different retaining guide 40 supporting surfaces 43. Each retaining guide supporting surface 43 redirects its respective bundle B, C and D vertically downward to a hardware device N directly below it. In a similar fashion a cable media bundle E is received by a 90-degree rollout arm 26*b*, redirected substantially horizontally and distributed to three guides 18 as three discrete bundles. One of the three bundles, bundle F, is received by guide 18*a*, redirected and distributed as two separate bundles G and I, one to each of two different hardware devices Na and Nb. Lastly, a 180-degree rollout arm 28 receives an upwardly directed cable media bundle J from below, supports the cable media, and redirects the cable media C about one hundred and eighty degrees from the reception direction downward toward another hardware device Nc. In this fashion, as described above and shown in FIG. 2, the invention efficiently receives bundles of cable media from any direction, and redirects and distributes the cable media in discrete bundles to individual hardware devices.

An important advantage of the present invention is that cable media may be distributed to computer hardware components in dedicated, discrete bundles. Referring again to FIG. 3, bundle G may be manipulated by a service technician without the need to move or otherwise disturb any cables in the neighboring bundles D or I. Accordingly, one may quickly and entirely disengage or otherwise manipulate bundle G cable media to access the individual network component Na without accidentally damaging any of the cables in bundles D or I, or disengaging cables in bundles D and I from devices Nd and Nb, respectively. Since the present invention minimizes the number of cables that must be moved to access component Na to the cables present in bundle G, the time required to service or replace component Na is accordingly minimized. Moreover, since one may service component Na without moving or manipulating other cables not present in bundle G, the problem of inadvertently damaging other cables or causing difficult-to-isolate partial cable disconnects on other components is eliminated. Therefore, service times for hardware installations utilizing cable management according to the present invention should be lower than the service time required for prior art installations without the same management, since those prior art systems will be more likely to suffer damage or partial cable disconnects through movement of cables for other components. Accordingly, the increased time requirements involved in servicing computer hardware utilizing no cable management or prior art cable management systems increases the downtime of the hardware itself when service is required, which is a significant problem since when a device supports mission-critical functions.

The curved cable supporting surfaces 19, 27, 29 and 43 all have a common radius R. However, it is not important in practicing the invention that they all share a common radius R, and alternative embodiments of the rollout arms 26 and 28 and guides 18 and 40 (not shown) may have dissimilar radii. What is important is that the radius R is sufficiently large so that cable media may be redirected without causing damage to the cable media. This is particularly important in the handling of fiber-optic cable media: if fiber optic media is redirected at an acute angle, it may crack and fail. In this way the invention facilitates the handling, redirection, organization and distribution of cable media in a manner that protects the cable media from damage. Accordingly, the minimum value of the radius R is preferably about 1.5 inches for fiber-optic cable media. For applications not involving fiber-optic media, such as coaxial cable, twinaxial cable, solid wire copper cable, or twisted pair copper cable, the minimum value of R may be smaller. Generally, depending upon the internal structure of the alternative cable chosen, such as the number of conductors or the insulator composition and size, R may have a minimum value of about 0.5 inches.

Figure 4:
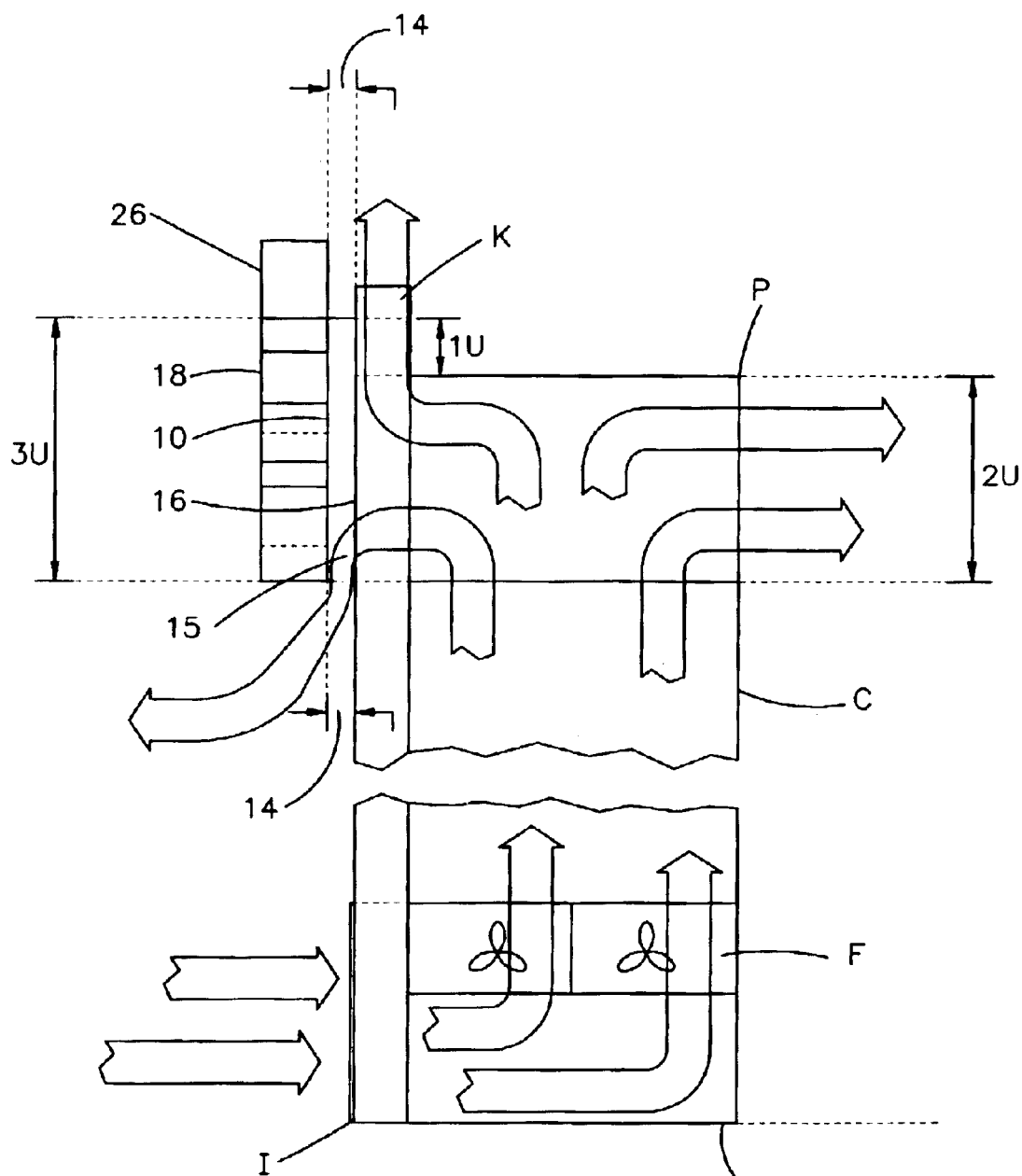
FIG. 4 is a side elevation view of the present invention as implemented in a computer hardware rack system.

Another important element of the invention is that the invention may be mounted on a rack directly on top of other hardware equipment. By overlapping other hardware components the invention frees up usable space on the rack, and therefore the equipment rack space required for installation and implementation of the invention is less that the actual size of the invention. Referring now to FIG. 4, the flange 16 is shown mounted onto the EIA RS-310-D vertical rack rail K. The flanges 16 and the support 10 are about 3 "$\mu$" high, where $\mu$ is a unit of height defined by the EIA RS-310-D standard as equivalent to about 1.75 inches, and therefore the heights of flanges 16 and support 10 are about 5.25 inches. Accordingly, the flange 16 and the support 10 require about $3\mu$ of available rack space on the rack rail K. An EIA RS-310-D compliant computer hardware device N is also mounted onto rack rail K, and requires about $20\mu$ of rack space. The device N comprises a bottom air inlet area I having a pair of ventilation fans F, a network server card C, and an upper air plenum area P. The device N shown in FIG. 4 is chosen for illustrative purposes, and may comprise other types of computer hardware components, such as network routers or LAN switches (not shown). The air plenum P requires about $2\mu$ of rack space on rack rail K. The plenum P provides an exhaust for air blown across the network card C by fans F, where the air blown across the card C is drawn into the device N through air inlet I. Since the support 10 is offset from the flanges 16 by a distance 14, as discussed earlier in this specification, although mounted directly over the plenum P, air may be exhausted above and below the support 10 by passing out of the plenum P and through the offset area 15. In order to provide an area sufficiently large enough to provide an effective exhaust space for the plenum P, where the support 10 provides a minimal acceptable resistance to the air flow, the minimum value of the offset distance 14 is preferably about 0.75 inches. Furthermore, if the offset distance 14 value is set to a minimum of about 2.0 inches, then the support 10 will have no significant effect on air flow from the plenum P: the air flow from the plenum P through the offset area 15 will be equivalent to the air flow present where no support 10 is mounted over the plenum P.

The flanges 16 are mounted onto the rack rail K with the bottom edges of the flanges 16 and support 10 directly over the bottom edge of the plenum P area. Accordingly, although the flanges 16 and support 10 are $3\mu$ in height, they only utilize $1\mu$ of usable hardware space on rack rail K: the bottom $2\mu$ of flanges 16 and support 10 overlap the $2\mu$ of the plenum P. By requiring only $1\mu$ of rack rail K space, the invention enables a typical rack installation to provide for cable management and still have enough room for stacking two rows of hardware components. For example, a typical EIA RS-310-D vertical rack may have about $42\mu$ of usable hardware mounting space. Since a typical EIA RS-310-D compliant hardware component requires about $20\mu$ of rack space, and the present invention requires about $1\mu$ of usable rack space, then two rows of EIA RS310-D compliant hardware components may be installed on the typical EIA RS-310-D vertical rack, and each row may be served by a cable management device according to the present invention. The flanges 16 and support 10 may also be mounted over other types of rack components, such as the air inlet area I or filler panels (not shown).

Moreover, although the embodiment of the invention thus described has been configured for use with an EIA RS-310-D vertical rack, it is to be understood, however, that this is just one illustration of how the method and structure of the present invention can be used, and the invention can be practiced on horizontal racks and in other types of hardware dimensional systems and standards. Similarly, although the embodiment described has two flanges 16 for connecting to two vertical rack rails K, alternative embodiments (not shown) may require only one flange for mounting upon one rack rail.

While preferred embodiments of the invention has been described herein, variations in the design and method may be made, and such variations may be apparent to those skilled in the art of making hardware installation devices, as well as to those skilled in other arts. Moreover, the materials identified above are by no means the only materials suitable for the manufacture of the invention, and substitute materials will be readily apparent to one skilled in the art. Accordingly, various rearrangements, modifications, and substitutions may be implemented without departing from the true spirit of the invention as hereinafter claimed. The scope of the invention, therefore, is only to be limited by the following claims.

What is claimed is:

1. A device comprising:

a support having a frontal face;

at least a first curved surface projecting from the support frontal face, said at least first curved surface having a first radius sufficiently large to receive and redirect a first type of cable media without cracking or causing other damage to the first type of cable media;

at least a second curved surface projecting from the support frontal face, said at least second curved surface having a second radius with a minimum value different from that of the first radius to receive and redirect a second type of cable media; and a pair of rack mounting flanges operatively connected to the support, said pair of rack mounting flanges being spaced relative to each other and being offset a predefined distance from said frontal face wherein the offset defines at least one dimension of a passage through which air flows when said device is mounted to another surface.

2. The device of claim 1 wherein the first type of cable media includes fiber-optic cable media.

3. The device of claim 2 wherein the second type of cable media includes non fiber-optic cable media.

4. The device of claim 1 wherein minimum radius of the first curve surface is 1.5 inches.

5. The device of claim 4 wherein minimum radius for the second curve surface is 0.5 inches.

6. The device of claim 1 wherein the support is fabricated from planar sheet metal.

7. The device of claim 1 wherein the support and mounting flanges are fabricated from a single sheet of planar sheet metal.

8. The device of claim 1 wherein the offset is at least 0.075 inches.

9. A device comprising:

a support having a frontal face;

at least a first curved surface projecting from the support frontal face, said at least first curved surface having a first radius sufficiently large to receive and redirect a first type of cable media without cracking or causing other damage to the first type of cable media; and at least a second curved surface projecting from the support frontal face, said at least second curved surface having a second radius with a minimum value different from that of the first radius to receive and redirect a second type of cable media;

at least one flange for mounting said device operatively connected to the support and offset a predefined distance from said frontal face; and at least one removable pull-out arm having a curved surface of a predefined radius operatively mounted to said frontal face.

* * * * *